(12) United States Patent
Masel et al.

(10) Patent No.: US 7,108,773 B2
(45) Date of Patent: Sep. 19, 2006

(54) SOLIDS SUPPORTING MASS TRANSFER FOR FUEL CELLS AND OTHER APPLICATIONS AND SOLUTIONS AND METHODS FOR FORMING

(75) Inventors: Richard I. Masel, Champaign, IL (US); Cynthia A. Rice, Champaign, IL (US)

(73) Assignee: The Board of Trustees of the University of Illinois, Urbana, IL (US)

(*) Notice: Subject to any disclaimer, the term of this patent is extended or adjusted under 35 U.S.C. 154(b) by 344 days.

(21) Appl. No.: 10/241,306

(22) Filed: Sep. 11, 2002

(65) Prior Publication Data

US 2004/0045816 A1  Mar. 11, 2004

(51) Int. Cl.
- C25B 11/06 (2006.01)
- H01M 8/10 (2006.01)
- H01M 4/90 (2006.01)
- H01M 4/92 (2006.01)
- B01J 21/18 (2006.01)

(52) U.S. Cl. .......... 204/252; 204/290.14; 204/294; 429/40; 429/41; 429/42; 429/30; 502/182

(58) Field of Classification Search ......... 204/290.14; 502/182; 977/DIG. 1; 429/40, 30, 33, 44, 429/41

See application file for complete search history.

(56) References Cited

U.S. PATENT DOCUMENTS 5,234,777 A  8/1993  Wilson (Continued)

FOREIGN PATENT DOCUMENTS

JP  07-172807 A * 7/1995
JP  2000-0044216 A * 2/2000
WO  WO 02/05365 A1 * 1/2002

OTHER PUBLICATIONS

B. Rajesh et al, "Anodes for Direct Methanol Fuel Cells", Dec. 2001, Chemical Industry Digest, vol. 14, Issue 6, pp. 83 87.*
"Carbon nanotube", from Wikipedia.com (http://en.wikipedia.org/w/index.php?title=Carbon_nanotube).*
Eve S. Steigerwalt, Gregg A. Deluga, David E. Cliffel, and C.M. Lukehart, "A Pt-Ru/Graphitic Carbon Nanofiber Nanocomposite Exhibiting High Relative Performance as a Direct-Methanol Fuel Cell Anode Catalyst", J. Phys. Chem. B 2001, 105, pp. 8097-8101.
Sang Hoon Joo, Seong Jae Choi, Ilwhan Oh, Juhyoun Kwak, Zheng Liu, Osamu Terasaki, and Ryong Ryoo, "Ordered nanoporous arrays of carbon supporting high dispersions of platinum nanoparticles", Nature, vol. 412, Jul. 12, 2001, www.nature.com, pp. 169-172.
S.J. Lee, S. Mukerjee, J. McBreen, Y.W. Rho, Y.T. Kho, and T.H. Lee, "Effects of Nafion impregnation on performances of PEMFC electrodes", Electrochimica Acta, vol. 43, No. 24, pp. 3693-3701, 1998.
Anastasios L. Skoulidas, David M. Ackerman, J. Karl Johnson, and David S. Sholl, "Rapid Transport of Gases in Carbon Nanotubes", Physical Review Letters, vol. 89, No. 18, Oct. 28, 2002, pp. 185901-1-185901-4.
G. Hummer JC Rasalah and JP Noworyta "Water Conduction through the Hydrophobic channel of a Carbon nanotube" Nature, vol. 414, Nov. 2001, pp. 188-190.
A.K. Shukla, P. Stevens, A. Hamnett, J.B. Goodenough, "A Nation-bound platinized carbon electrode for oxygen reduction in solid polymer electrolyte cells", pp. 383-386, Sep. 9, 1988.

*Primary Examiner*—Roy King
*Assistant Examiner*—Harry D. Wilkins, III
(74) *Attorney, Agent, or Firm*—Greer, Burns & Crain, Ltd.

(57) ABSTRACT

A solution useful for forming a solid that supports mass transfer includes carbon nanotubes and a solvent. Solids formed using the solution thereby have carbon nanotubes dispersed therein that are useful for communicating gas and/or electric charges within the solid. Catalyst layers of the invention that include carbon nanotubes can provide high levels of efficiency while requiring low catalyst concentrations.

27 Claims, 4 Drawing Sheets

U.S. PATENT DOCUMENTS

| | | |
|---|---|---|
| 5,415,888 A | 5/1995 | Banerjee et al. |
| 5,650,132 A * | 7/1997 | Murata et al. ............... 423/650 |
| 6,159,538 A | 12/2000 | Rodriguez et al. |
| 6,205,016 B1 * | 3/2001 | Niu ............................ 361/503 |
| 6,291,091 B1 * | 9/2001 | Preischl et al. ............... 429/30 |
| 6,309,772 B1 | 10/2001 | Zuber et al. |
| 6,319,293 B1 | 11/2001 | Debe et al. |
| 6,589,682 B1 * | 7/2003 | Fleckner et al. ............... 429/34 |
| 2002/0049134 A1 * | 4/2002 | Imazato ....................... 502/101 |
| 2002/0106552 A1 * | 8/2002 | Yamaura et al. ............... 429/44 |
| 2002/0177032 A1 * | 11/2002 | Suenaga et al. ............... 429/44 |
| 2004/0076871 A1 * | 4/2004 | Gascoyne et al. ............ 429/42 |
| 2004/0110057 A1 * | 6/2004 | Yoshimoto et al. ........... 429/38 |
| 2004/0115516 A1 * | 6/2004 | Miyake et al. ................. 429/42 |
| 2004/0167014 A1 * | 8/2004 | Yan et al. .................... 502/101 |
| 2004/0197638 A1 * | 10/2004 | McElrath et al. .............. 429/44 |

* cited by examiner

A COMPARISON OF PERFORMANCE OF THE ELECTRODES WITH CATALYST LAYERS OF THE INVENTION ("WITH NANOTUBES") VERSES THE ELECTRODE WITH CATALYST LAYERS OF THE PRIOR ART ("WITHOUT NANOTUBES")

VI CHARACTERISTICS OF A FUEL CELL PAINTED WITH A CATALYST LAYER OF THE INVENTION ("PTPD" - WITH NANOTUBES) AND WITH A CATALYST LAYER OF THE PRIOR ART ("NO" - NO NANOTUBES)

SOLIDS SUPPORTING MASS TRANSFER FOR FUEL CELLS AND OTHER APPLICATIONS AND SOLUTIONS AND METHODS FOR FORMING

STATEMENT OF GOVERNMENT INTEREST

The present invention was made with Government assistance under DARPRA/US Air Force Grant No. F33615-01-C-2172. The Government has certain rights in this invention.

FIELD OF THE INVENTION

The present invention is related to solids containing nanotubes that are operative to communicate gas and/or electrical charge. The present invention is also directed to catalyst inks and layers, as well as membrane electrode assemblies and electrochemical cells. The present invention also concerns fuel cells.

BACKGROUND OF THE INVENTION

In many applications it is desirable for gas and/or electrical charge to diffuse or otherwise pass into or through a solid layer. Often, however, the solid material may not support useful rates of diffusion or other mechanisms for passing gas and/or charge. By way of example, catalyst particles dispersed in a so-called catalyst layer in an electrochemical cell or fuel cell provide a catalyzing medium spread over an area. In order for the catalyst particles in the layer to be active, they will desirably have relatively easy access to gas and be able to conduct electrical charge. The layer may also be required to conduct protons. Proton conducting materials, however, often do not provide good support for gas and/or charge diffusion and conduction.

Catalyst layers are of particular utility when used with electrochemical cells employing a membrane and electrode assembly, with an example being proton exchange membrane (PEM) fuel cells. These cells may include a membrane electrode assembly (MEA) consisting of a proton exchange or solid polymer electrolyte membrane coated on one or both of its operative surfaces with a catalyst layer. Fuel and air are converted to electricity on the MEA, with the catalyst layer providing for higher conversion rates. The active catalyst typically comprises precious metal particles, and most commonly one or more of Pt, Pd, or Ir; or Pt or Pd alloyed with one or more of Pd, Ru, Mo, Ni, Fe, Co, Mn.

Because of their expense, it is desirable to minimize the amount of catalyst particles required while maintaining high levels of cell efficiency. Accordingly, it is desirable for high proportions of the catalyst particles to be active. Also, providing thin catalyst layers may be useful to minimize the catalyst particle cost. Catalyst inks that include catalyst particles suspended in a solvent are useful for providing a thin catalyst layer. For example, it is known to spread a catalyst ink on a proton exchange membrane and then hot press the resultant structure to remove the solvent and fix the catalyst particles near the surface of the membrane. Such a method is described in detail, for example, in U.S. Pat. No. 5,234,277 to Wilson et al., and "A NAFION-Bound Platinized Carbon Electrode For Oxygen Reduction In Solid Polymer Electrolyte Cells," A. K. Shukla et al., J. Appl. Electrochem., 19 pp. 383–386 (1989). These methods and resultant catalyst layers, however, have problems associated with them. For example, hot pressing can result in damage or destruction of the membrane, and can result in poor mass transfer and proton conductivity within the catalyst layer. These problems cause reduced fuel cell efficiency and current output from the cell.

A solution to some of the problems of these prior art inks and layers was proposed in U.S. Pat. No. 5,415,888 to Banejee et al. Generally, the '888 patent teaches the addition of proton-conducting polymers, such as NAFION (NAFION is a registered trademark of the DuPont Chemical Corporations, Wilmington, Del.), to a catalyst ink. Inclusion of the proton-conducting polymer reduced the need for hot pressing and its related disadvantages. In practice, the catalyst ink is applied to the proton exchange membrane and the solvent is removed, leaving catalyst particles embedded in a thin layer of the cast proton-conducting polymer. In addition to acting as an electrolyte to provide a path for proton conduction away from the catalyst, the solid proton-conducting polymer also fixedly holds the catalyst particles in position.

The teachings of the '888 patent leave several problems unresolved. For example, a portion of the active catalyst is often buried in the proton-conducting polymer layer, which generally does not support good rates of gas diffusion or electron conduction. In a buried state the catalyst particle is thus essentially inactive and wasted because it is not easily accessible to reactants (i.e. fuel or air/oxygen) or to the current collector. Wasted catalyst keeps the relative cost of these methods and layers high and lowers their efficiency. Also, the cast form of the proton-conducting polymer that results when the catalyst ink dries typically does not have satisfactorily, high proton conductivity. These and other problems are discussed in "Effects Of NAFION Impregnation On Performances Of PEMFC Electrodes," Lee et al., Electrochimica Acta 43(24):3693–3701, 1998.

A more recently proposed solution is presented in U.S. Pat. No. 6,309,722 to Zuber et al. The '722 patent teaches adding insoluble components to the inks to induce porosity in the conducting polymer layer. The porosity partially overcomes problems associated with the catalyst being isolated from the reactants. However, the porosity does not overcome the problem of the catalyst being electrically isolated from the current collector or the problem of the limited proton conductivity of the cast proton-conducting polymer. In addition, achieving porosity adds time and cost to the preparation of the catalyst inks and layers.

Some prior art fuel cell applications seek a high density catalyst loading in order to achieve small fuel cell size. For example, in mini and microelectronics applications small fuel cells are desirable. For these applications, the prior art has had limited success in achieving suitably high loadings.

These and other problems in the art remain unresolved.

SUMMARY OF THE INVENTION

In an exemplary solid of the invention, carbon nanotubes are distributed in a solid material, with at least 1% by weight of the nanotubes having unobstructed inner passages and thereby operative to communicate gas within the solid. More preferably, at least about 10% by weight, and most preferably at least about 50%, of the nanotubes have unobstructed inner passages.

In other exemplary embodiments of the invention, catalyst inks and layers of the invention include carbon nanotubes to communicate gas and/or electrical charge. A catalyst ink of the invention includes a solvent with carbon nanotubes and catalyst particles dispersed in the solvent. At least about 1% by weight of the catalyst particles, are independent from the carbon nanotubes. More preferably, at least about 5% by weight, and most preferably at least about 75% by weight of the catalyst particles are independent of the carbon nanotubes.

An additional exemplary catalyst ink of the invention includes a solvent with carbon nanotubes and catalyst particles dispersed in the solvent. At least about 1% by weight of the carbon nanotubes have unobstructed inner passages. More preferably, at least about 10% by weight, and most preferably at least about 50% by weight of the nanotubes have un-obstructed inner passages.

Still another exemplary embodiment of the invention is directed to a catalyst layer. The layer includes a proton-conducting layer with catalyst particles and carbon nanotubes fixedly held therein. The carbon nanotubes are operative to communicate gas and electrons within the layer. The catalyst particles may have a diameter that is larger than the diameter of an inner passage of the carbon nanotubes.

DETAILED DESCRIPTION

An embodiment of the present invention is directed to solids having nanotubes distributed therein for communicating gas. Some exemplary embodiments of the present invention are directed to catalyst inks, as well as to methods for making catalyst inks. Other embodiments of the invention are directed to catalyst layers, to membrane electrode assemblies, and to electrochemical cells. It will be appreciated when considering discussion and description of any particular embodiment of the invention that such description and discussion may be useful in considering other invention embodiments. For example, it will be appreciated that discussion of a method for making a catalyst ink of the invention will be useful in considering a catalyst ink of the invention, and that discussion of a catalyst ink of the invention will be useful in considering a catalyst layer of the invention that may be formed through application of the ink. All of the various embodiments of the invention have in common that they include carbon nanotubes. It has been discovered that nanotubes provide valuable advantages in their ability to communicate gas and electrical charge in the invention embodiments.

The present invention provides many advantages and solves many problems of the prior art. For example, it has been discovered that inclusion of carbon nanotubes in catalyst inks and catalyst layers of the invention substantially improves the efficiency of the inks and layers over the prior art. It is believed that carbon nanotubes provided in catalyst inks and layers of the present invention generally act as paths for electron conduction and for efficient gas communication. As a result, a high proportion, and preferably substantially all of the catalyst particles in inks and catalyst layers of the present invention are active. Catalyst inks and layers of the invention can therefore be formed using less catalyst than in some inks and layers of the prior art without a corresponding loss in efficiency.

Those knowledgeable in the art will appreciate that a "carbon nanotube" is a structure of carbon atoms having a generally cylindrical shape and an inner passage. That is, a carbon nanotube is a structure of carbon atoms arranged in a general tube shape. Carbon nanotubes are useful for, among other things, communicating gas through their inner passages, and for communicating electrons along their walls. A variety of particular carbon nanotubes are possible, with single and multiple wall tubes being two examples. A wide range of lengths, diameters, and weights of carbon nanotubes are possible. Many references are available to provide further detail regarding carbon nanotubes, including "Carbon nanotubes—the route toward applications," Baughman R H. Zakhidov A A. de Heer W A. Science. 297,787–792 (2002), incorporated herein by reference.

Figure 1:
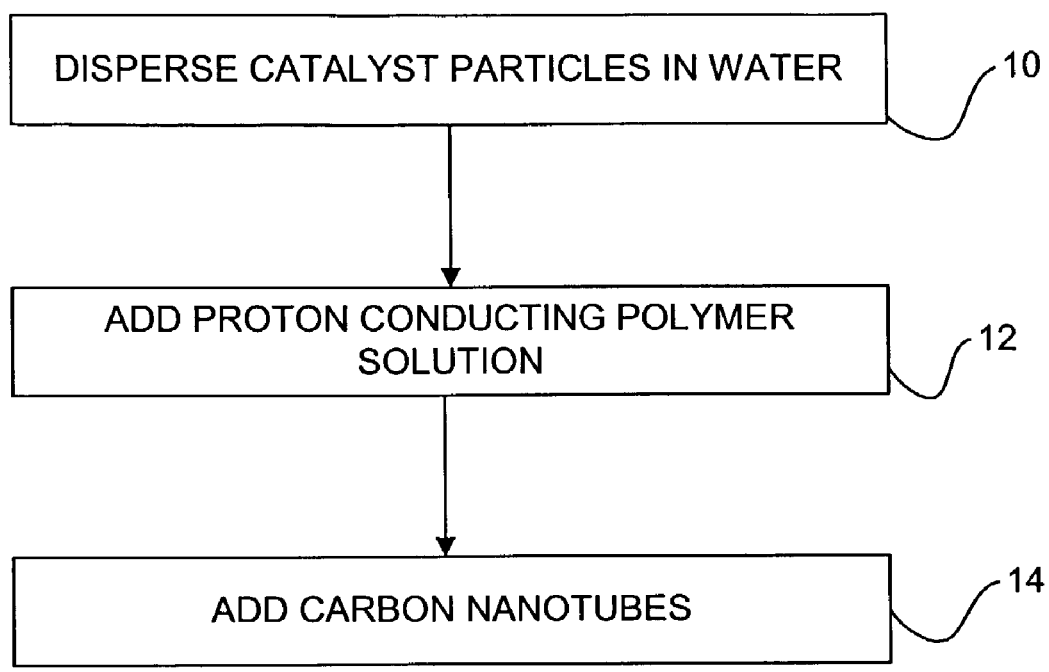
FIG. 1 is a flowchart illustrating an exemplary method of the invention.

Turning now to the drawings, FIG. 1 is a flowchart illustrating an exemplary method for making a catalyst ink of the invention. In a first step, catalyst particles are dispersed in a water solvent (block 10). A proton conducting polymer solution containing a proton-conducting polymer dissolved in a solvent is then added (block 12). Carbon nanotubes are then added to the solution to form the catalyst ink (block 14).

Having now presented this general exemplary method, a more detailed exemplary method of preparing a catalyst ink of the invention may be considered. To prepare the ink, 10 mg of catalyst platinum-palladium nanoparticles were mixed with 100 mg of Millipore water and 22 mg of a commercial 5% NAFION solution (Solution technologies 1200 EW). NAFION is a registered trademark of DuPont Chemical Corp., Wilmington, Del., and is a perfluorosulfonic acid copolymer. The inactive portion of the 5% NAFION solution is a solvent such as an alcohol and/or a ketone. When the solvent is removed and the perfluorosulfonic acid copolymer forms a solid, it is useful as a proton-conducting medium.

Although catalyst inks and methods for making catalyst inks of the invention preferably include a proton-conducting material such as NAFION, it will be understood that this is a preferred composition only. The invention may be practiced without such an ingredient. Also, it will be understood that perfluorosulfonic acid polymers and copolymers are preferred proton-conducting materials only, and that many alternatives and equivalents exist. Examples of other proton-conducting materials include acids such as sulfuric acid, sulfonated and phosphated polymers, metal oxides, metal phosphates, metal sulfates, metal hydrates, as well as other materials that are known in the art. The proton-conducting material, with NAFION as an example, may also provide some traditional binder functionality. The catalyst ink of the invention could also be formulated using other binders, with an example being polyannaline.

In the present example, the proton-conducting polymer is added in a weight ratio of about 1:10 to the catalyst particles (22 mg×5% concentration=1.1 mg NAFION). This weight ratio will change depending on factors such as the molecular weight of the catalyst and the proton-conducting polymer, catalyst layer design parameters, and the like. It is believed that weight ranges of between about 1:20 and about 1:2 (proton-conducting polymer:catalyst particle) will prove most useful in practice of the invention, although other weight ranges are also possible.

It will also be appreciated that the present invention may be practiced using any of a variety of catalysts. Metals, and precious metals in particular, are preferred, with Pt and Pd being most preferred examples. Those knowledgeable in the art will appreciate that Pt and Pd are particularly well suited for facilitating the conversion of $H_2$ molecules to H+ ions and protons, and in facilitating the conversion of H+ ions, electrons and $O_2$ to $H_2O$. The invention could potentially be practiced with other catalysts, however, with known examples including Ir, Ru, Os, Rh, Ni, Co, Mn Mo, W, V, Ce, Ti, Pt/Ru, Pt/Co, Pt/Mn, Pt/Sn, and Pt/Fe. Also, as will be appreciated by those knowledgeable in the art, it may be desirable for economic or other reasons to practice the invention using catalyst particles that are supported on carbon or other materials such as a conducting polymer. It may be economically advantageous, for instance, to use smaller catalyst particles when they are supported on carbon than when they are present in an unsupported state.

In the exemplary method of the invention, the platinum-palladium nanoparticles, water, and NAFION solution are mixed in a sonic bath for 20 minutes. 10 mg of ground nanotubes (Alpha-Aesar 42886) are then added to the ink, and the solution is mixed in an ultrasonic bath. In this example formulation, a weight ratio of about 1:1 (nanotubes:catalyst particles) has been used. A weight ratio of between, about 1:3 and about 3:1 is preferred for practice of the invention. Other weight ratios (nanotubes:catalyst particles) are also believed useful, with particular examples including between about 1:10 and 10:1, between about 1:100 and 100:1, and between about 1:100 and 500:1. A desired weight range may change depending on factors such as the particular catalyst, as well as the size and weight of the particular carbon nanotube selected. Accordingly, it will be appreciated that a wide variety of weight ratio ranges are possible for practice of the invention. The ranges disclosed, however, are believed to be the most useful for typical catalysts and carbon nanotubes.

Useful weight ranges will also depend on the economics of the materials used. That is, one advantage of the invention is that carbon nanotubes can be used to essentially replace more expensive catalyst particles. At some high weight ratio of nanotubes to catalyst particles, however, the large amount of nanotubes used will not offer an economic advantage. At current price levels, for example, weight ratios above about 500:1 when using Pt/Pd catalyst particles offer little economic advantage.

In an exemplary embodiment of a catalyst ink of the present invention, at least about 1% of the catalyst particles are independent of the carbon nanotubes. As used herein, the term "independent" when use in the context of nanotubes and catalyst particles is intended to be broadly interpreted as the particles and nanotubes being unattached to one another. If, for example, a catalyst particle were supported by or were held within a carbon nanotube, it would not be independent of the nanotube.

Preferably, at least about 5% by weight of the catalyst particles are independent of the nanotubes, and more preferably at least about 75% of the catalyst particles are independent of the nanotubes. Also, in a preferred catalyst ink of the invention, at least about 1% by weight of the nanotubes have an unobstructed inner passage. As used herein, the term "unobstructed inner passage" is intended to be broadly interpreted as meaning an inner passage operable to communicate gas. A nanotube that had a particle held in its inner passage and was thus prevented from communicating gas through its inner passage, therefore, would not be considered to be "unobstructed." More preferred catalyst inks of the invention include at least 10% by weight, and most preferred include at least about 50%, nanotubes with unobstructed inner passages.

In practice, performing separate steps of dispersing the catalyst particles and the carbon nanotubes in the solvent may be useful to ensure that most, if not all, of the catalyst particles remain independent of the carbon nanotubes. Another method step for keeping catalyst particles independent from the nanotubes is to use catalyst particles that have a diameter larger than the inside diameter of the nanotubes used (or using catalyst particles that are on a support that has a diameter larger than the inside diameter of the nanotubes). It will be appreciated that different catalyst particle sizes may be selected depending on different catalyst materials, applications and design parameters. By way of an exemplary size range, catalyst particles may have a diameter of between about 6 and about 20 nanometers. Accordingly, nanotubes in an exemplary invention embodiment may have an inside diameter of less than about 6 nanometers.

Still an additional method step for keeping catalyst particles independent from nanotubes takes advantage of their hydrophobic nature. In particular, if catalyst particles are dispersed in a protic solvent, they should remain independent of the hydrophobic nanotubes. Accordingly, use of protic solvents is preferred in catalyst inks and methods for making catalyst inks of the invention. Those knowledgeable in the art will appreciate that a variety of protic solvents are known. By way of example, solvents having a cohesive energy density ($\delta$) not less than about 10 cal/gm$^3$ may be protic. When protic solvent are used, nanotubes with an inner passage diameter that is larger than catalyst particle diameters may be used. For example, nanotubes having an inner diameter of between about 5 and about 20 nm may be used with catalyst particles that have a diameter between about 6 and about 10 nm.

A summary of the ingredients and preferred weight ratios of the exemplary ink of the invention is presented in TABLE 1:

| Material: | Weight: | Parts by Weight (Dry Basis*) |
| --- | --- | --- |
| Pt/Pd Catalyst nanoparticles | 10 mg | 10 |
| Water Solvent | 100 mg | — |
| 5% Nafion Solution (95% alcohol/Ketone solvent) | 22 mg (1.1 mg Nafion) | 1.1 (active) |
| Carbon nanotubes | 10 mg | |

*Dry Basis - excluding all solvents

It will be appreciated that a catalyst layer of the present invention may be formed by applying a catalyst ink of the invention to a surface and removing the solvent(s) through drying. Accordingly, a catalyst layer of the invention may have the same weight ratios as a catalyst ink of the invention.

Figure 2:
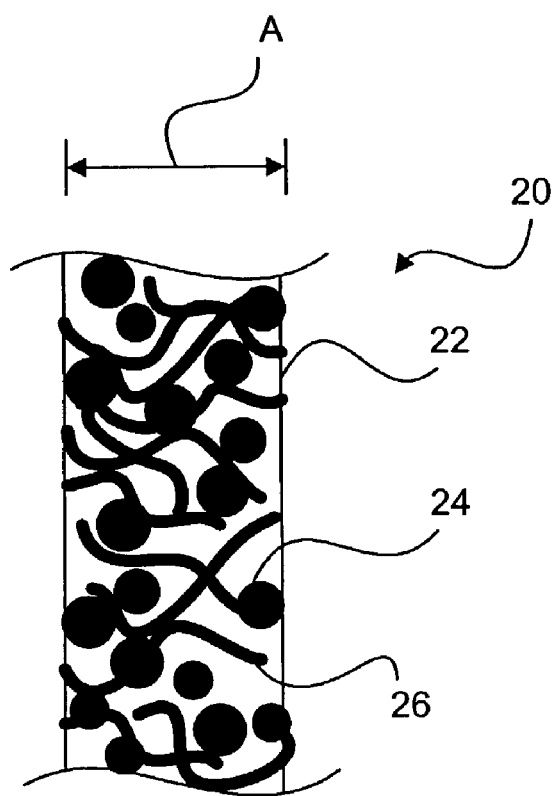
FIG. 2 is a cross section of a portion of an exemplary catalyst layer of the invention.

FIG. 2 is a cross section of an exemplary catalyst layer 20 of the invention. The layer 20 includes a solid or semi-solid proton conducting polymer 22 that generally defines the layer 20, a multiplicity of catalyst particles 24, and a multiplicity of carbon nanotubes 26. The layer 20 may be formed, for example, when a catalyst ink of the invention is painted or otherwise deposited onto a surface and dried. Drying may occur through application of heat and/or vacuum or partial vacuum, and results in removal of a sufficient amount of the solvent(s) of the catalyst ink to leave the solid or semi-solid catalyst layer 20.

In operation, the carbon nanotubes 26 provide efficient pathways for gas molecules and electrons to travel through the body of the proton-conducting polymer 22. Gas molecules may travel through the inner passage of a nanotube 26 at a much faster rate than it would otherwise diffuse through the polymer 22. Also, it will be appreciated that the nanotubes 26 may have a plurality or multiplicity of holes along its walls through which gas molecules can enter or exit the tube 26, so that they function in the manner of a "highway" having a multiplicity of entrances and exits. Gas may thereby be efficiently communicated to a catalyst particle 24 that is buried in body of the layer 20. The nanotubes 26 function in a similar manner in communicating electrons along their walls and in communicating protons. The presence of the nanotubes 26 thereby provides substantial advantages and results in a high efficiency rate for the layer 20.

In selecting the length of the nanotubes 26 to be used in practice of the invention, the thickness of A of the catalyst layer 20 may be considered. In particular, the length of nanotubes 26 is preferably equal to or greater than the thickness A. Lengths of this magnitude are believed to increase the probability that the nanotubes 26 are exposed to one of the surfaces of the catalyst layer 20, and thereby provide useful access to that surface. It will be appreciated that a layer thickness A may be selected based on any of a variety of design and/or performance parameters of a particular application. In many applications it is generally desirable to form a relatively thin catalyst layer 20 to minimize the cost of catalyst particles. A minimum thickness A should likewise be maintained, however, to ensure sufficient catalyst exposure.

By way of particular example, an exemplary catalyst layer of the invention may be formed with a thickness A of between about 2 and about 10 microns. Other applications may call for thicker layers. By way of example, mini and micro electronics may use relatively thick layers to maximize catalyst loadings per unit area. In these applications, a thickness A of up to about 500 microns may be useful.

Although FIG. 2 is not drawn to scale, it will be appreciated when considering FIG. 2 that invention embodiments may be practiced using non-uniform mixtures of catalyst particles 24, nanotubes 26, and other materials. For example, catalyst particles 24 of different materials and sizes may be included in a layer 20 or ink of the invention. Likewise, nanotubes 26 having different lengths and inside diameters could be used in a layer 20 or ink.

Because at least about 1% of the catalyst particles 24 in catalyst inks of the invention, and preferably at least 75%, are independent of the nanotubes 26, they will be separated from the tubes 26 by some distance when the ink dries to form the solid catalyst layer 20. Accordingly, an equal proportion, and most preferably substantially all of, the carbon nanotubes 26 will have generally open and unobstructed inner passages. The particles 24 that were freely dispersed in the ink will be individually embedded in the proton-conducting polymer 22 (and/or other binder if one was provided). As generally illustrated in FIG. 2, using catalyst particles 24 that have a diameter larger than that of the inside diameter of the carbon nanotubes 26 greatly lowers the likelihood that any particles 24 will become lodged in the tubes 26.

It will be appreciated that the catalyst particles 24 need not be in direct physical contact in the dried catalyst layer 20 with the proton-conducting polymer 22 or with a nanotube 26. Indeed, in operation a catalyst particle 24 may be within a thin envelope of fluid such as water, gas, or acid within the proton-conducting polymer 22 and thus be separated by some small distance from the proton-conducting polymer 22.

It is believed that when the catalyst particles 24 in a catalyst layer 20 of the invention are located within a preferred distance of about 50 nm or less from a carbon nanotube 26, the catalyst layer 20 will achieve a high level of performance. Although separation distances larger than this preferred distance may be useful for practice of the invention, maintaining the preferred distance as a limit is believed to result in high levels of layer efficiency. Communication of gas, electrons, and protons through the layer 20 may be further enhanced by providing a porous layer 20.

Figure 3:
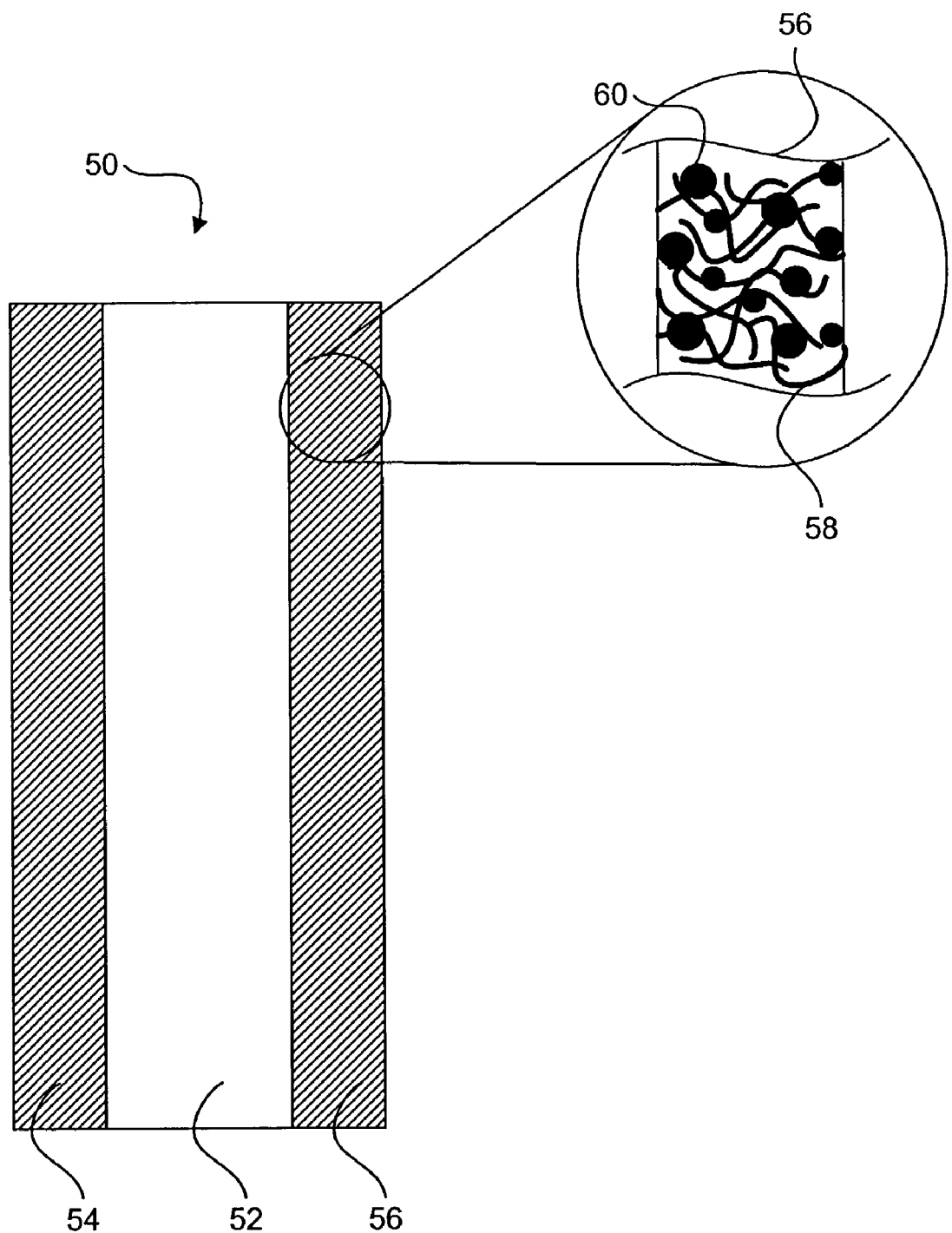
FIG. 3 is a cross section of an exemplary membrane electrode assembly of the invention.

In addition to catalyst layers, catalyst inks, and methods for preparing catalyst inks, the present invention is also directed to membrane electrode assemblies and to fuel cells. FIG. 3 is a schematic cross section of a membrane electrode assembly (MEA) 50 of the invention. Generally, the MEA 50 includes a polymer electrolyte membrane 52 such as NAFION that has been coated on two opposing surfaces with catalyst layers 54 and 56 of the invention. The enlarged view of the layer 56 shown in FIG. 3 illustrates the carbon nanotubes 58 and catalyst particles 60 that are embedded in the layer.

Figure 4:
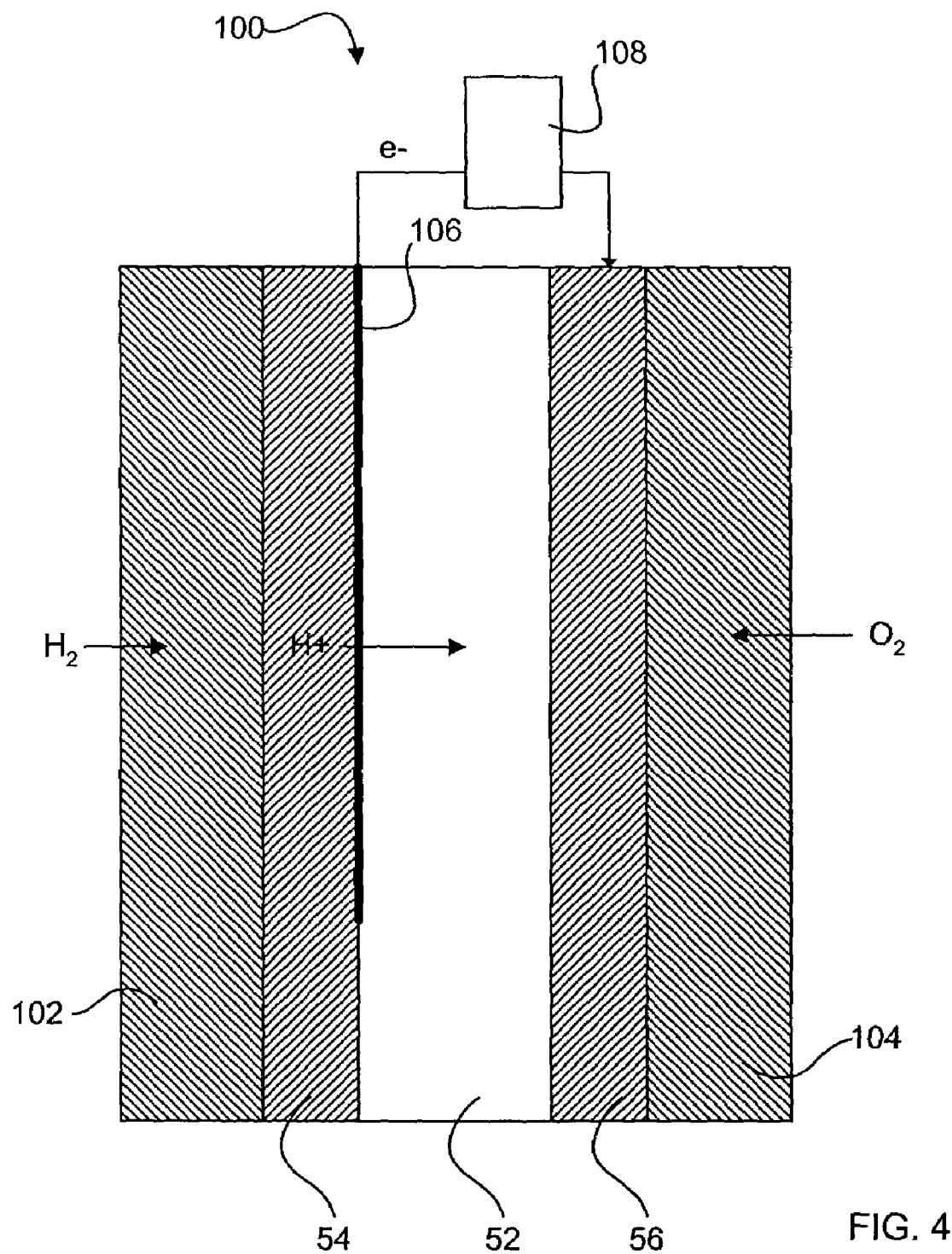
FIG. 4 is a schematic, partly in cross section, of an exemplary fuel cell of the invention.

Operation of the MEA 50 of the invention may be best illustrated through consideration of the schematic cross section of a polymer electrolyte fuel cell (PEMFC) 100 of the invention shown in FIG. 4. The PEMFC 100 generally includes the MEA 50, with the addition of a gas permeable anode layer 102 covering the catalyst layer 54, and the gas permeable cathode layer 104 covering the catalyst layer 56. The anode layer 102 is operative to communicate fuel gas to the catalyst layer 54, where the catalyst particles facilitate the conversion of fuel molecules to positively charged fuel ions and free electrons. Free electrons are collected by the current collector 106 and flow to the cathode catalyst layer 56, and may be exploited in route thereto by a load such as an electrical device 108.

Advantageously, carbon nanotubes 58 in the catalyst layer 54 of the invention are operative to communicate the fuel gas to catalyst particles 60 that are embedded in the layer 54 and that otherwise would have been much more difficult or impractical for the gas to reach. Likewise, the carbon nanotubes 58 serve to greatly increase the rate of communication of free electrons from embedded catalyst particles 60 to the current collector 106, and to aid the communication of protons through the layer 54. As a result of these and other advantages, the catalyst layers 54 and 56 of the invention are able to support high reaction rates while requiring relatively low amounts of catalyst. By way of example, catalyst layers of the invention may be useful with Pt and/or Pd catalyst particles at a coverage of less than about 10 mg/cm$^2$.

Further, other exemplary catalyst layers of the present invention may be exploited to provide catalyst layers having high catalyst loadings for applications such as micro and mini electronics in which compact fuel cells are desirable. In particular, it is believed that catalyst layers of the invention may be prepared with catalyst loadings greater than about 12 mg/cm$^2$, and of greater than 20 mg/cm$^2$.

On the cathode side of the PEMFC 100, catalyst particles 60 of the catalyst layer 56 facilitate the combination of free electrons, charged fuel ions, and $O_2$. Advantageously, the carbon nanotubes 58 of the catalyst layer 56 allow catalyst particles 60 that are embedded in the layer to be readily accessible to $O_2$ gas and to free electrons. As a result, the catalyst layer 56 achieves a high catalyst activity rate that is preferably at or near to 100%. It will be appreciated that the fuel cell 100 may include additional elements that are well known in the art and have not been illustrated in FIG. 4 for the sake of brevity. For example, manifolds or enclosures may be provided for communicating gas to and from the anode and cathode 102 and 104.

In order to measure some of the benefits of the invention, a catalyst layer of the invention was prepared using the exemplary catalyst ink prepared using the weight ratios of TABLE 1, and was compared to a control layer of the prior art. In particular, the catalyst ink of the invention was painted onto a carbon electrode in an electrochemical half-cell. Current was applied and measured in the half-cell with a formic acid concentration of 0.1 N. The current after 2 hours was 0.4 milli-amps per milligram of platinum/palladium at 0.4 V with respect to RHE. As a control, a second batch of catalyst ink was prepared as above except that no nanotubes were added. The control catalyst was painted onto a second carbon electrode, and the current was measured in a half-cell using procedures identical to those above. The current after 2 hours was 0.15 milli-amps/milligram of platinum/palladium at 0.4 V with respect to RHE. The results of this experiment suggest that the presence of the nanotubes more than doubled the electrode efficiency.

Figure 5:
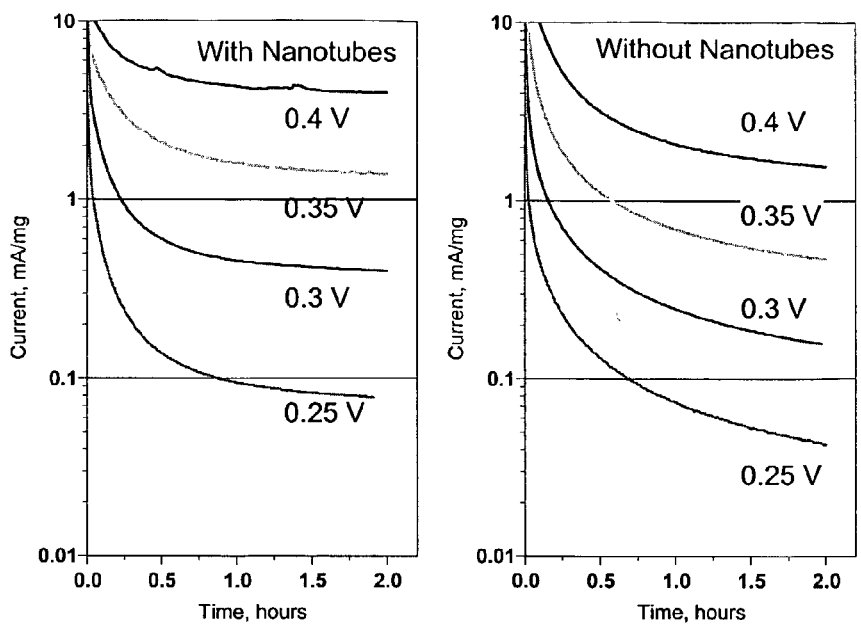
FIG. 5 illustrates experimental results in graphical form.

FIG. 5 illustrates additional experimental data for similar experiments in which a first electrode was painted with a catalyst ink of the invention including nanotubes, while control electrodes were painted with prior art catalyst inks that were identical except that nanotubes were not included. The experimental data suggests that the resultant current is generally a factor of 2 higher for catalyst inks and layers of the invention that include nanotubes.

A formic acid/humidified $O_2$ fuel cell testing fixture with anode/cathode flow fields machined into conductive graphite blocks was used to further test embodiments of the invention. A membrane electrode assembly (MEA) of the invention was positioned in between the graphite blocks. Temperature and pressure were regulated in the cell. The MEA of the invention had an active cell area of 5 $cm^2$. A nanotube catalyst ink of the invention was prepared as described above. The ink was directly painted onto a NAFION 117 membrane. The cathode side for each MEA had a standard loading of 7 $mg/cm^2$ platinum black (Johnson Matthey). The catalyst loading of the anode was 4 $mg/cm^2$ of Pt/Pd. A carbon cloth diffusion layer was placed on top of both the cathode and anode catalyst layers. The carbon cloth on the cathode side was Teflon coated for water management.

Figure 6:
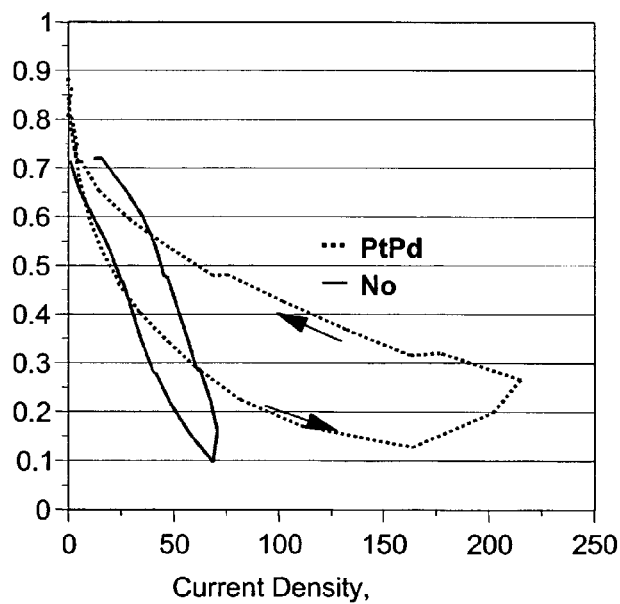
FIG. 6 illustrates additional experimental results in graphical form.

During the experiments the fuel cell temperature was maintained at 30° C. During normal fuel cell operation, 1 mL/min formic acid was used as the anode fuel and 100 sccm humidified (40° C.) $O_2$ as the cathode oxidant. The cell polarization curve was measured using a 60 amp fuel cell testing station (available from Fuel Cell Technologies, Inc.). FIG. 6 illustrates a comparison of the test fuel cell polarization (voltage-current) curve for formic acid oxidation for a catalyst layer of the invention (with nanotubes) and for an identical control catalyst layer of the prior art, except that no nanotubes were provided (without nanoparticles). The results of FIG. 6 show that the fuel cell current is about three times higher when for catalyst layers of the present invention as compared to controls of the prior art.

These results demonstrate that current in a fuel cell can be substantially increased through practice of the invention with catalyst inks and layers that include carbon nanotubes. Alternatively, a desired fixed current could potentially be produced using a catalyst ink/layer that used substantially less catalyst particles than was possible in the prior art through the addition of nanotubes.

The present invention thereby provides many advantages and solves many otherwise unresolved problems in the art. For example, inclusion of carbon nanotubes allows for gases and free electrons to be more readily communicated into and through catalyst layers so that catalyst particles embedded in the layers may remain active. As a result, substantially all of the catalyst particles in a layer may be active, with a resultant high efficiency achieved for the catalyst layer and low required catalyst concentration. Electrochemical membrane exchange assemblies and fuel cells that incorporate catalyst layers of the invention may thus be constructed at reduced costs and increased efficiencies.

It is intended that the specific embodiments and configurations herein disclosed are illustrative of the preferred and best modes for practicing the invention, and should not be interpreted as limitations on the scope of the invention as defined by the appended claims. For example, it will be appreciated that although catalyst inks and layers have been illustrated and discussed herein, the present invention has many additional applications. Indeed, the present invention is directed to any solid medium that includes carbon nanotubes operative to communicate gas and/or electrical charge.

Likewise, although catalyst inks and layers have been illustrated including particular materials and components, additional materials and components may be present in other inks and layers of the invention. By way of particular example, materials could be added to provide a degree of porosity to a layer of the invention to further increase its ability to communicate gas, electrons, and protons. Indeed, while particular embodiments of the present invention have been described herein, it will be appreciated by those skilled in the art that many changes and modifications may be made thereto without departing from the invention in its broader aspects and as set forth in the following claims.

What is claimed is:

1. A solid that supports mass transfer comprising:
   a solid material that conducts protons;
   catalyst particles dispersed in said solid material; and,
   hydrophobic carbon nanotubes distributed in said solid material, at least about 1% by weight of said nanotubes having unobstructed inner passages free from said catalyst particles and thereby being operative to communicate gas within said solid material, and wherein at least about 5% by weight of said catalyst particles being unsupported by said carbon nanotubes, said carbon nanotubes being present in a weight ratio to said catalyst particles of between about 1:3 and 3:1, and wherein said carbon nanotubes have an inside diameter equal to or smaller than a diameter of said catalyst particles.

2. A solid that supports mass transfer as defined by claim 1 wherein said solid material comprises a perfluorosulfonic acid polymer or copolymer.

3. A solid that supports mass transfer as defined by claim 1 wherein at least about 5% by weight of said nanotubes have unobstructed inner passages.

4. A solid that supports mass transfer as defined by claim 1 wherein at least about 50% by weight of said nanotubes have unobstructed inner passages free from said catalyst particles.

5. A solid that supports mass transfer as defined by claim 1 wherein substantially all of said nanotubes have unobstructed inner passages free from said catalyst particles.

6. A solid that supports mass transfer as defined by claim 1 wherein said nanotubes have a multiplicity of holes along their walls operable to communicate gas.

7. A solid that supports mass transfer as defined by claim 1 wherein said nanotubes have an inside diameter of between about 5 and about 20 nm.

8. A solid that supports mass transfer as defined by claim 1 wherein said solid material is formed in the shape of a layer having a thickness, and wherein said nanotubes have a length that is at least as large as said layer thickness.

9. A solid that supports mass transfer as defined by claim 1 wherein said carbon nanotubes are operative to conduct electrical charge in said solid material.

10. A solid that supports mass transfer as defined by claim 1 wherein an end of at least a portion of said nanotubes are exposed to a surface of said solid material.

11. A solid that supports mass transfer as defined by claim 1 wherein at least about 75% by weight of said catalyst particles are independent from said carbon nanotubes, and wherein at least about 50% by weight of said nanotubes have unobstructed inner passages.

12. A solid that supports mass transfer as defined by claim 1 wherein substantially all of said catalyst particles are located within a distance of about 50 nm from at least one of said carbon nanotubes.

13. A solid that supports mass transfer as defined by claim 1 wherein the catalyst layer is part of a fuel cell that includes a current collector, and wherein said proton conducting layer has a surface adjacent to said fuel cell current collector.

14. A solid that supports mass transfer as defined by claim 1 wherein said proton-conducting layer comprises one or more of a perfluorosulfonic acid polymer or copolymer, sulfuric acid, sulfonated and phosphated polymers, metal oxides, metal phosphates, metal sulfates, metal hydrates, and wherein said catalyst particles comprise one or more of Pt, Pd, Ir, Ru, Os, Rh, Ni, Co, Mn, Mo, W, V, Ce, and Ti.

15. A solid that supports mass transfer as defined by claim 1 wherein said solid material that conducts protons is present in a weight ratio to said catalyst particles of between about 1:20 and about 1:2.

16. A solid that supports mass transfer as defined by claim 1 wherein substantially all of said catalyst particles are active.

17. A solid that supports mass transfer as defined by claim 1 wherein the solid that supports mass transfer defines a catalyst layer with a thickness of not more than about 10 microns.

18. A solid that supports mass transfer as defined by claim 1 wherein the solid that supports mass transfer forms a catalyst layer sandwiched between an electrolyte layer and a current collector.

19. A solid that supports mass transfer as defined by claim 1 wherein said catalyst particles comprise one or more of Pt, Pd, Ir, Ru, Os, Rh, Ni, Co, Mn, Mo, and W, and wherein said catalyst particles are dispersed at a concentration of greater than about 12 mg/cm$^2$.

20. A solid that supports mass transfer as defined by claim 1 wherein said catalyst particles comprise one or more of Pt, Pd, Ir, Ru, Os, Rh, Ni, Co, Mn, Mo, and W, and wherein said catalyst particles are dispersed at a concentration of greater than about 20 mg/cm$^2$.

21. A solid that supports mass transfer as defined by claim 1 wherein said catalyst particles comprise one or more of Pt, Pd, Ir, Ru, Os, Rh, Ni, Co, Mn, Mo, and W, and wherein said catalyst particles are dispersed at a concentration of less than about 10 mg/cm$^2$.

22. A solid that supports mass transfer as defined by claim 1 wherein the solid that supports mass transfer is porous.

23. A solid that supports mass transfer as defined by claim 1 wherein said catalyst particles are not supported by said carbon nanotubes.

24. A solid that supports mass transfer as defined by claim 1 wherein:

the solid that supports mass transfer defines a catalyst layer with a thickness of not more than about 10 microns;

said catalyst particles are dispersed at a concentration of greater than about 12 mg/cm$^2$; and, said nanotubes have a multiplicity of holes along their walls operable to communicate gas.

25. A membrane electrode assembly comprising:

a solid electrolyte having two opposing surfaces; and, a catalyst layer on each of said two opposing surfaces of said solid electrolyte, each of said catalyst layers having a thickness of not more than about 500 µm and comprising a proton-conducting material, precious metal catalyst particles dispersed in said proton-conducting material and carbon nanotubes dispersed in said proton-conducting material and independent from said catalyst particles, at least about 10% by weight of said carbon nanotubes having unobstructed inner passages free from said catalyst particles, with a diameter of between about 6 and about 20 nm that is equal to or smaller than the size of said catalyst particles.

26. A membrane electrode assembly as defined by claim 25, wherein said membrane electrode assembly is part of a solid polymer electrolyte fuel cell, and further comprising:

an anode layer on one of said catalyst layers; and a cathode layer on the other of said catalyst layers.

27. A membrane electrode assembly as defined by claim 25 wherein:

said nanotubes are hydrophobic, have a multiplicity of holes along the length of their walls operable to communicate gas, and are present in a weight ratio of between about 1:3 and 3:1 to said precious metal catalyst particles.

* * * * *

UNITED STATES PATENT AND TRADEMARK OFFICE
CERTIFICATE OF CORRECTION

PATENT NO.       : 7,108,773 B2                                          Page 1 of 1
APPLICATION NO.  : 10/241306
DATED            : September 19, 2006
INVENTOR(S)      : Masel et al.

It is certified that error appears in the above-identified patent and that said Letters Patent is hereby corrected as shown below:

In the Issued Patent:

Column 2, lines 5-6, please delete "Banejee" and insert --Banerjee-- therefor.

Column 2, line 29, after "satisfactorily", please delete --,-- (comma).

Column 2, line 66, after "particles", please delete --,-- (comma).

Column 5, line 50, after "when", please delete "use" and insert --used-- therefor.

Column 6, in the table at lines 42-50, in the column labeled "Parts by Weight (Dry basis*)", and in the row indicating "Carbon nanotubes" please insert --10--.

Signed and Sealed this

Twenty-fifth Day of September, 2007

JON W. DUDAS
*Director of the United States Patent and Trademark Office*